May 12, 1964 W. PINSLY 3,132,872
TANDEM KIT FOR A BICYCLE
Filed March 14, 1962 2 Sheets-Sheet 1
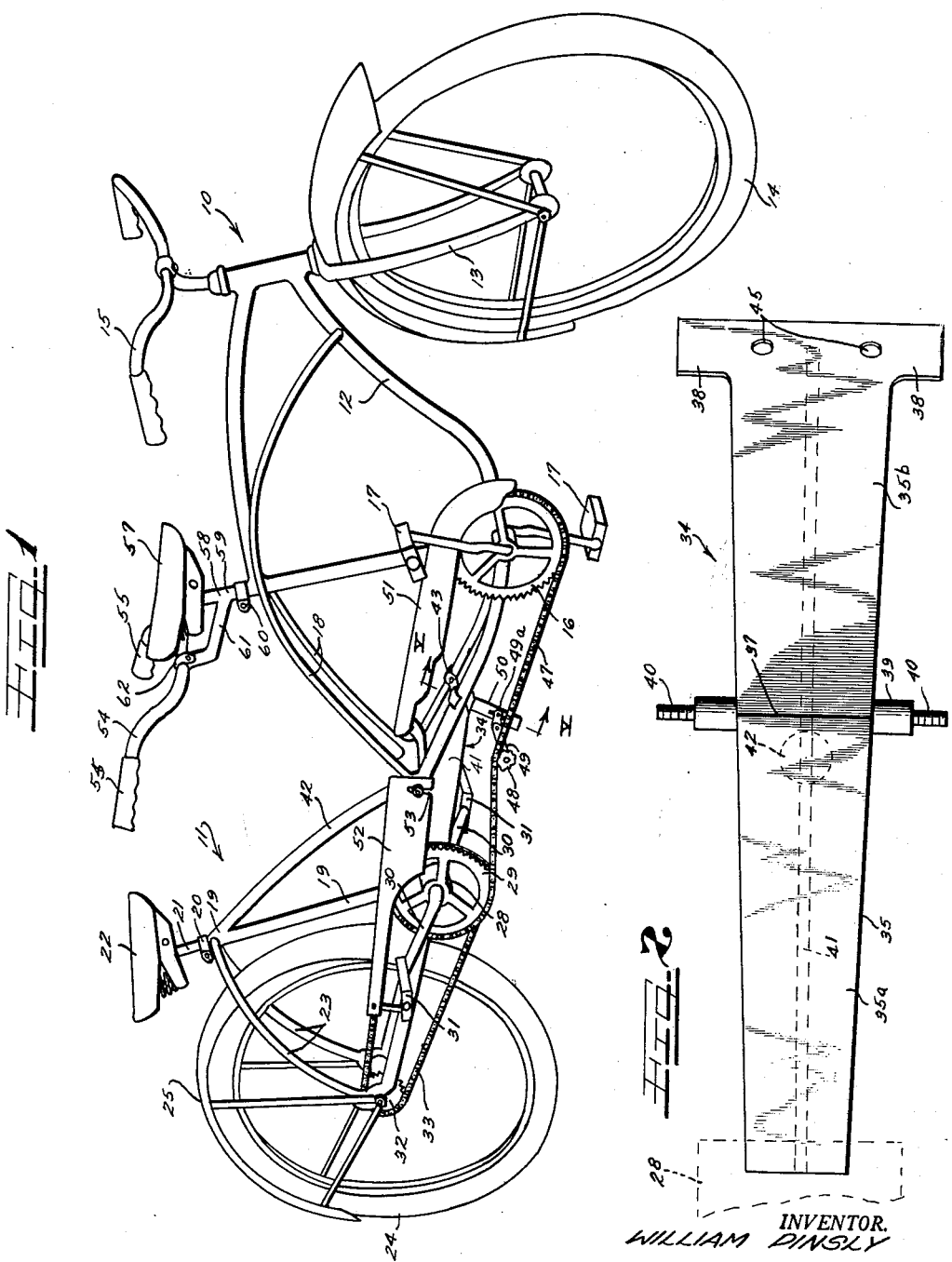
INVENTOR.
WILLIAM PINSLY
BY
ATTORNEYS

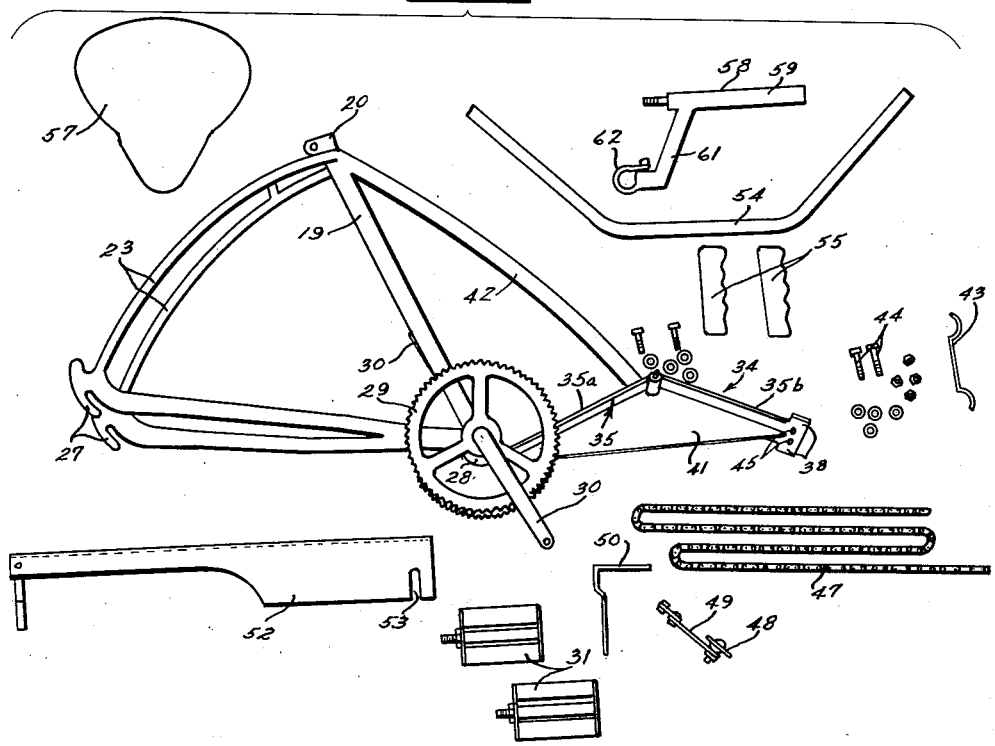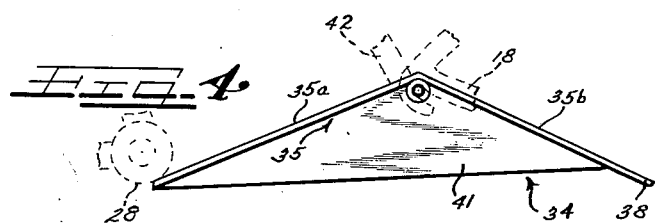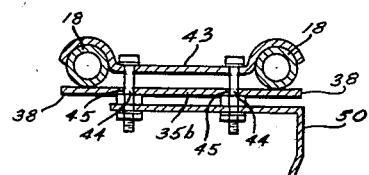

United States Patent Office 3,132,872
Patented May 12, 1964

3,132,872
TANDEM KIT FOR A BICYCLE
William Pinsly, 309 Orchard Ave., Hillside, Ill.
Filed Mar. 14, 1962, Ser. No. 179,599
11 Claims. (Cl. 280—7.16)

The present invention relates to improvements in bicycles and more particularly concerns a new and improved kit with which a regular single person bicycle can be converted into a tandem bicycle.

An important object of the present invention is to provide new and improved means for converting a single seat bicycle into a tandem bicycle.

Another object of the invention is to provide a novel tandem kit with which a single seat bicycle can be converted into a tandem bicycle simply and easily without making any structural changes in the regular bicycle, and by using the standard tools for working on the regular bicycle.

A further object of the invention is to provide a novel tandem kit structure adapted for providing a multi-seat bicycle by adding a plurality of the tandem kits in tandem fashion to a regular bicycle frame serving as the foremost unit of the tandem vehicle.

Still another object of the invention is to provide a tandem kit for bicycles which enables ready changing of the tandem arrangement to a one-seat unit when desired.

Yet another object of the invention is to provide a tandem kit for bicycles which makes use of the existing rear driving wheel, fender, drive chain, chain guard, seat, and the like, in the changeover or conversion to the tandem, in other words, requiring no discarding or elimination of existing parts of the bicycle.

A still further object of the invention is to provide an economical, sturdy tandem attachment for a regular or standard bicycle, and which attachment can be installed quickly and easily.

Other objects, features and advantages of the present invention will be readily apparent from the following detailed description of a preferred embodiment thereof taken in conjunction with the accompanying drawings, in which:

FIGURE 1 is a perspective view of a tandem bicycle assembly embodying features of the present invention;

FIGURE 2 is a top plan view of the coupling bracket by which the tandem kit is attached to the frame of the regular bicycle;

FIGURE 3 is an exploded assembly view of the several parts and assemblies which constitute a complete kit for converting a regular one-seat bicycle into a tandem bicycle;

FIGURE 4 is a side elevational view of the coupling bracket; and

FIGURE 5 is an enlarged fragmentary sectional detail view taken substantially on the line V—V of FIGURE 1.

On reference to FIGURE 1, it will be recognized that in the tandem bicycle assembly shown a front rider portion 10 comprises components generally customary in a regular bicycle while attached to the rear of the front portion or section is a tandem portion or section 11. In the fully assembled relationship the front and rear sections 10 and 11 constitute a functional unit. However, as will become clear as the description proceeds, the rear or tandem section 11 is merely an attachment to the front section 10 and can be removed therefrom at will.

With respect to the front section 10, a regular one-seat bicycle frame 12 has swivelly mounted on the front thereof, as is customary, a fork 13 for steeringly mounting a front wheel 14 and carrying front handle bars 15. On its lower portion the regular, main bicycle frame 12 carries a customary rotary driving sprocket 16 equipped with pedals 17. In its rear bifurcated rear wheel receiving portion 18, the frame 12 provides means for attaching it to the tandem section 11.

In general respects, the tandem section 11 comprises an arrangement similar to the rear, person-supporting portion of a regular bicycle. To this end, a rigid frame 19 (FIGS. 1 and 3) is provided having an upper seat attaching structure including a conventional clamp 20 receptive of a stem 21 on a seat 22. A bifurcated rear portion 23 of the tandem frame is receptive in the usual manner of a rear driven bicycle wheel 24 and fender 25, means comprising rear wheel axle engaging lugs 27 being provided similarly as on a regular bicycle frame.

On its lower portion, the tandem frame 19 has a bearing hub 28 rotatably supporting a double sprocket 29 having crank arms 30 on which are mounted, in the usual removable fashion, pedals 31. For driving by the sprocket 29 there is trained thereover a bicycle drive chain 33 which is also trained over a rear driving wheel sprocket 32.

For coupling the tandem section 11 to the front bicycle section 10, the tandem frame 19 carries a novel coupling bracket 34 on its lower forward portion. In an extremely rugged, lightweight construction, the coupling bracket 34 comprises an elongated generally upwardly facing body flange 35 (FIGS. 2, 3 and 4) bent intermediately its length on an apex 37 into a rear leg panel portion 35a and a front leg panel portion 35b. In a practical form, the flange plate 35 may be made from steel stock of ⅛ to 3/16" thickness, with the rear leg 35a about 9" long and the front leg 35b about 8" long, the two legs diverging on an included angle of 130° to 138°. The flange plate 35 may, as best seen in FIG. 2, be of tapered form from a width of about 2" at the free end of the rear leg 35a to a width of about 3¼" at the base of respective equally oppositely extending front end lateral ears 38 projecting from the front leg 35b. The distance between the ends of the ears 38 may be about 5¼" while the ears themselves may be about 1" in width.

Within the angle defined by the bend 37, a transverse hub 39 is rigidly secured as by means of welding or the like to project equally to opposite sides of the flange plate 35. This hub is of a length to be received endwise between the axle lugs of the bicycle frame rear wheel bifurcations 18, and threaded studs 40 projecting from the ends of the hub 39 are engaged by such lugs and the lugs tightened against the ends of the hub 39 by means of suitable nuts. Alternatively, the ends of the hub 39 may be tapped and bolts threaded thereinto in place of the studs 40 and nuts.

A reinforcing web plate 41 of generally triangular form is rigidly secured to the flange plate 35 within the angle formed by the legs 35a and 35b, preferably by welding the same centrally longitudinally to the flange legs.

It will be appreciated, of course, that if preferred the bracket 34 may be forged or cast in one piece.

Attachment of the bracket 34 to the tandem frame 19 is effected by securing the free end portion of the rear leg 35a to the hub 28 of the frame as by welding, and by securing the opposite end portion of the rear leg 35a, adjacent to the crest 37, to the lower forward end portion of a frame bar 42 which projects from the upper end of the tandem frame 19 downwardly and forwardly to a suitable length. In a practical form, the lower end of the bar 42 is welded to the bracket leg 35a. This affords a forward orientation of the bracket leg 35b beyond the front bar 42 of the tandem frame for attachment cooperation with the rear portion 18 of the bicycle frame.

Rigid attachment of the tandem section 11 to the bicycle 10 through the medium of the bracket 34 is easily and quickly affected by removing the rear wheel 24 and the fender 25 from the bicycle 10 and securing the front leg 35b of the bracket to the lower rear portion of the bicycle frame. To this end, the rear axle engaging lugs of the bicycle frame are engaged with the studs 40 and the front end ears 38 are engaged under the respective lower bars of the bicycle frame rear portion 18 as best seen in FIGS. 1 and 5. A clamping yoke bar 43 engaging upon the bicycle frame bars where they overlie the ears 38 is secured fixedly to the forward end portion of the bracket leg 35b by suitable means such as bolts 44, the bracket leg having bolt holes 45 therethrough for this purpose. As a result of this efficient four point interengagement and attachment of the coupling bracket with the bicycle frame a thoroughly stable, twist proof, rugged connection of the tandem 11 to the bicycle 10 is attained. Any tendency toward swivelling or skewing of the tandem 11 relative to the bicycle is effectively precluded by the yokes of the yoke bracket 43 coacting with the frame bars 18 a substantial distance forwardly from the engagement of the engagement lugs of the bicycle frame with the ends of the bracket hub bar 39 against which the lugs are desirably secured in the same manner as such lugs are secured to the axis structure of the removed rear wheel. Furthermore, by having the angle of the bracket leg 35b properly correlated to the engagement lugs and the angularity of the bicycle frame bars 18 between the engagement lugs and the points at which the yoke bracket 43 and the ears 38 engage such bars, the attached relationship of the tandem 11 to the bicycle 10 will assure the proper position of the upper part of the tandem frame 19 for supporting the saddle or seat 22 in proper relation to the bicycle 10 for the tandem rider.

In the course of assembling the tandem 11 with the bicycle 10, a tandem coupling drive chain 47 is applied to replace the regular bicycle drive chain 33 which latter is transferred to the tandem 11 as is also the rear wheel 24 and the fender 25 of the bicycle. This drive chain 47 is of sufficient length and span to be trained over the bicycle driving sprocket 16 and one of the sets of teeth of the double driving sprocket 29 of the tandem 11. The upper forward run of the coupling drive chain 47 passes over the right-hand end portion of the hub bar 39 between the adjacent bicycle frame bar structure 18 and the crest portion 37 of the bracket flange 35.

For slack take-up, an idler sprocket 48 meshes with and raises the lower run of the coupling drive chain 47 (FIG. 1). This idler sprocket 48 is mounted on an arm 49 adjustably carried by a generally L-shaped bracket 50 having one leg desirably attached under the forward end of the bracket arm 35b by means of the bolts 44 as best seen in FIG. 5 while the remaining leg projects downwardly inside and adjacent to the chain 47 and has a vertically elongated slot, as shown, receptive of a bolt 49a by which the arm 49 is vertically adjustably attachable to the bracket. Thereby, the coupling drive chain 47 can be properly tensioned by appropriate vertical adjustment of the idler sprocket 48 through the adjustable arm 49.

Suitable guards are desirably provided over the driving sprockets 16 and 29 and the drive chains. Thus, the bicycle section 10 is provided with such a guard 51. The tandem section 11 is provided with a guard 52 which at its forward end portion is conveniently provided with a downwardly opening slot 53 by which it is adapted to engage over the right-hand stud 40 of the coupling bracket hub for attachment by the securing member such as the nut which is carried by such stud.

For the convenience of the tandem rider, a handle bar 54, desirably equipped with hand grips 55 is provided behind a saddle seat 57 for the rider of the bicycle 10. For this purpose a combination handle bar and saddle seat adapter bracket 58 is provided comprising a seat post 59 height adjustable in the usual manner within a retaining clamp 60 on the upper rear portion of the bicycle frame 12. In addition, the bracket 58 has an angular rearwardly and upwardly extending arm 61 equipped with a terminal clamp 62 for adjustably engaging and attaching the handle bar 54 to the bracket arm.

As a matter of convenience, the handle bar 54 with the hand grips 55, the seat 57 and the bracket 58 are supplied as part of the tandem kit, while the seat 21 with its supporting stem or post 21 is transferred from the bicycle portion 10 to the tandem portion 11.

In FIGURE 3 are shown the various parts which may be supplied in a "do-it-yourself" kit. Since the regular bicycle to which the assembled kit is to be attached requires no reconstruction or physical alteration of any part, but merely a removal and relocation of certain parts, namely the saddle seat, the rear wheel and fender and the drive chain, assembly of such relocated components from the bicycle with the tandem frame 19, and attachment of the tandem section 11 with the bicycle section 10, all with the aid of the usual tools, including bicycle wrenches, customarily employed, anyone with the barest mechanical skill in relation to bicycle assembly and maintenance can effect conversion of a regular bicycle into a tandem bicycle, or the reverse. The component parts of the kit are few and simple, fit together in a simple and uncomplicated manner and require no unusual or expert adjustments to assure satisfactory, trouble-free service.

In view of the fact that the rear portion 23 of the tandem frame 19 is generally similar to that of a regular bicycle frame, it is entirely practical to construct a multi-tandem assembly wherein one or more tandem assemblies 11 are assembled in tandem relation with the rear wheel 24 supporting the rearmost of the tandem assemblies.

It will be understood that modifications and variations may be effected without departing from the scope of the novel concepts of the present invention.

I claim as my invention:

1. In a tandem kit for a bicycle, a tandem frame including:
   upper means for supported attachment of a bicycle saddle seat,
   rear means for supporting attachment of a rear driving wheel equipped with a sprocket,
   a lower portion hub and a rotary double driving sprocket and pedal unit supported by the hub for receiving thereover a regular bicycle drive chain which is also trained over the driving wheel sprocket,
   and a forward coupling bracket having means for attachment to the rear portion of a regular bicycle frame;
   a sprocket chain for drivingly coupling said double sprocket with the regular driving sprocket on a regular bicycle frame with which said tandem frame is coupled by said coupling bracket,
   and a combination handle bar and saddle seat adapter unit constructed and arranged for substitution for the regular bicycle saddle seat structure and including a seat post having as an integral rigid angular branch therefrom a rearwardly and upwardly extending arm equipped with a terminal clamp for adjustably engaging and attaching a handle bar to the arm.

2. In a tandem bicycle assembly,
   a regular bicycle section,
   a tandem bicycle section,
   means detachably coupling said sections,
   each of said sections having driving sprocket and pedal means,
   means coupling said driving means,
   said tandem section having a rear driving wheel drivingly coupled to said coupling means,
   said bicycle section having a front wheel and steering fork and handle bars,
   said tandem section having a saddle seat,
   and said regular bicycle section having a combination saddle seat and handle bar assembly including a seat post having as an integral rigid branch therefrom an angular rearwardly and upwardly extending arm equipped with terminal clamp means for adjustably engaging and attaching the handle bar in place relative to the seat.

3. In a tandem bicycle assembly including a tandem frame, said frame having a forwardly projecting attachment bracket arm including means for detachable securement to the rear portion of a regular bicycle frame after the rear wheel assembly has been removed from such regular bicycle frame, said arm including a pair of laterally projecting terminal ears for engaging under the lower frame bars of a bicycle frame rear portion, and means engageable with the tops of the lower frame bars for retaining said ears firmly in engagement with the undersides of the lower frame bars.

4. In a tandem bicycle assembly including a tandem frame, said frame having a forwardly projecting attachment bracket arm including means for detachable securement to the rear portion of a regular bicycle frame after the rear wheel assembly has been removed from such regular bicycle frame, said arm including a pair of laterally projecting terminal ears for engaging under the lower frame bars of a bicycle frame rear portion, and a yoke bracket engageable with the tops of the lower frame bars over said ears and including means for securing the yoke bracket clampingly to the arm for thereby effecting clamping of the lower frame bars between said ears and the yoke bracket.

5. In a tandem kit for a bicycle, a tandem frame, said tandem frame having a lower front portion including a coupling bracket, said coupling bracket having means thereon engageable by the usual rear axle engaging lug structure of a regular bicycle frame, said bracket having projecting forwardly from said means a coupling arm having a portion engageable with the underside of the lower bars of the regular bicycle frame forwardly from said lug structure, and means engageable with the upper side of said lower bars for attaching said arm to the bicycle frame.

6. A tandem assembly for attachment to the rear portion of a regular bicycle frame after the rear wheel has been removed from such regular bicycle frame, including:

a tandem frame including a forward downwardly and forwardly extending bar, a driving sprocket hub on the lower portion of the tandem frame rearwardly from the lower end of said forward bar, a coupling bracket having a rear portion rigidly secured to said hub and to the lower end of said forward bar and having a forwardly projecting coupling arm beyond said forward bar comprising a flange of substantial horizontal width attachable to the rear portion of the bicycle frame, and means for securing said flange to the rear portion of the bicycle frame.

7. A tandem assembly for attachment to the rear portion of a regular bicycle frame after the rear wheel has been removed from such regular bicycle frame, including:

a tandem frame including a forward downwardly and forwardly extending bar, a driving sprocket hub on the lower portion of the tandem frame rearwardly from the lower end of said forward bar, a coupling bracket having a rear portion rigidly secured to said hub and to the lower end of said forward bar and having a forwardly projecting coupling arm beyond said forward bar comprising a flange of substantial horizontal width attachable to the underside of lower frame bars of the rear portion of the bicycle frame, and means for engaging the upper side of the lower frame bars and connected to said flange for securing it in place with respect to said lower frame bars.

8. A tandem assembly for attachment to the rear portion of a regular bicycle frame after the rear wheel has been removed from such regular bicycle frame, including:

a tandem frame including a forward downwardly and forwardly extending bar, a driving sprocket hub on the lower portion of the tandem frame spaced rearwardly from and below the lower end of said forward bar, a coupling bracket having:

a rear portion rigidly connected to said hub and extending upwardly and forwardly to and rigidly connected to the lower end of said forward bar, a forward portion extending from the front end of said rear portion to a substantial length forwardly and downwardly and having means at its front end portion for attachment to the rear portion of the bicycle frame, a reinforcing member extending between and connected to the undersides of said rear and forward portions of the bracket, and means on the bracket adjacent to juncture of said rear and forward portions thereof for engagement by axle lugs of the bicycle frame 9. A tandem assembly for attachment to the rear portion of a regular bicycle frame after the rear wheel has been removed from such regular bicycle frame, including:

a tandem frame having a forward downwardly and forwardly extending bar, a driving sprocket hub on the lower portion of the tandem frame spaced rearwardly from and below the lower end of said forward bar, a coupling bracket having an elongated upwardly facing plate intermediately bent into an upward apex to provide angularly related rear and front legs, said rear leg being rigidly secured at its rear end to said sprocket hub and rigidly secured on its front end portion to said forward bar, said front leg having on its front end portion means for attaching it to the lower bars of the bicycle frame rear portion, a generally triangular flange plate providing a central web within the angle formed by the legs and rigidly secured thereto in reinforcing relation, and means carried by the apex portion of said plate providing oppositely sideward studs for engagement by the rear axle engaging lugs of the rear portion of the bicycle frame.

10. In a tandem bicycle assembly including a regular bicycle section and a tandem bicycle accessory section attached to the rear portion of the regular bicycle section frame after the rear wheel has been removed from such regular bicycle frame and with a driving sprocket and pedal assembly carried by the regular bicycle section, the improvement comprising a coupling bracket rigid with the tandem section and carrying a sprocket and pedal driving assembly, a rear wheel carried by the tandem section and including a driving sprocket, a driving chain trained over said rear wheel driving sprocket and the sprocket of the tandem section sprocket and pedal assembly, a driving chain trained over the sprockets of and connecting both of said sprocket and pedal assemblies in coacting driving relation, said coupling bracket having a forwardly projecting portion engaging under the lower bars of the rear portion of the regular bicycle section, means engaging the upper sides of the rear bars and including downwardly projecting bolts, and means for tensioning said last mentioned sprocket
chain comprising
  a bracket secured in place on said bolts with respect to the underside of said bracket portion and having a depending arm inside and adjacent to said last mentioned chain,
  and an idler sprocket meshing with said last mentioned chain and adjustably attached to said depending arm for tensioning said last mentioned chain.

11. In a tandem kit for a bicycle,
a tandem frame including means for supporting a saddle seat and a supporting and driving wheel,
a driving sprocket and pedal hub on the lower portion of said frame,
a connecting bracket secured to said hub and projecting forwardly for attachment to the rear portion of a regular bicycle frame after the rear wheel of said regular bicycle has been removed and transferred to the tandem frame,
said bracket having studs thereon engageable by the wheel axle engaging lugs of the rear portion of the regular bicycle frame,
and a guard member having means for attaching it to the tandem frame rearwardly fromb said hub and being of a length to extend in protecting relation to a driving sprocket and chain carried by the tandem frame and with its forward portion projecting forwardly beyond the sprocket and having a downwardly opening slot within which the adjacent stud on the bracket is engaged for securing the forward end portion of the guard member in place on the bracket.

References Cited in the file of this patent

UNITED STATES PATENTS

| | | |
|---|---|---|
| 516,435 | Hasbrouck | Mar. 13, 1894 |
| 599,152 | Schluer | Feb. 15, 1898 |
| 2,482,472 | Fried | Sept. 20, 1949 |
| 2,723,566 | Hyman | Nov. 15, 1955 |

FOREIGN PATENTS

| | | |
|---|---|---|
| 50,882 | France | Jan. 9, 1941 |
| | (Addition to No. 853,194) | |
| 52,395 | France | Nov. 29, 1943 |
| | (Addition to No. 882,705) | |
| 927,581 | France | May 5, 1947 |
| 358,474 | Italy | Apr. 15, 1938 |
| 613,291 | Great Britain | Nov. 24, 1948 |
| 163,035 | Austria | May 10, 1949 |
| 84,547 | Switzerland | Mar. 16, 1920 |